March 15, 1966 G. P. WHITNEY 3,240,876

TELEVISION APPARATUS

Filed June 18, 1962 2 Sheets-Sheet 1

INVENTOR.
George P. Whitney
BY Mueller & Aichele
ATTYS.

INVENTOR.
George P. Whitney
BY Mueller & Aichele
ATTYS.

3,240,876

TELEVISION APPARATUS

George P. Whitney, Villa Park, Ill., assignor to Motorola, Inc., Chicago, Ill., a corporation of Illinois Filed June 18, 1962, Ser. No. 203,047
3 Claims. (Cl. 178—7.9)

This invention relates to television receivers and more particularly to cabinet structures for television receivers and the mounting of a cathode ray picture tube and protective panel in receiver cabinets.

Knock-down television receiver cabinets which can be readily assembled at the point of use are known in the prior art. These cabinets have the advantage of allowing disassembled cabinet parts to be stored and transported in component form for assembly at the time and place for a receiver chassis to be installed in the cabinet. However, in any simplified easily assembled cabinet it has been common to provide a frame within the cabinet which secures the television chassis and picture tube, as well as furnishes structural rigidity for the cabinet. Such a frame, of course, adds to the cost and weight of the television receiver.

While a picture tube may be directly secured to television cabinets of certain types, considerable difficulty may be encountered in satisfactorily securing a transparent panel for the face of the picture tube to protect viewers in case of picture tube implosion. A protective panel for a cathode ray picture tube should be mounted so as to permit removal for replacement of the tube, but should also be effectively sealed to the tube face to prevent entry of dust or moisture which could impair viewing of the reproduced image.

Accordingly, it is an object of this invention to provide improved means for retaining a protective panel in moisture proof and dust proof relation to a cathode ray picture tube.

Another object is to provide a knock-down television cabinet construction in which picture tube in its mounting means furnishes significant structural rigidity for the cabinet.

A further object is to simplify and reduce the number of parts in television cabinets and mountings for a picture tube and associated protective panel.

Still another object is to provide a protective panel and picture tube assembly along with a cabinet mounting for such assembly which is economical to manufacture and assemble.

In a particular form of the invention, a knock-down cabinet is fastened together by clamps and angle members along the joints thereof. Tube support members are located at the inner front corners thereof in diagonally opposing positions. An encircling band surrounds the picture tube and brackets join the band and the support members to rigidize the cabinet by means of the picture tube itself. A protective panel is mounted in spaced relation from the front of the picture tube by a sealing gasket. The gasket and panel may be secured by hook portions of the tube mounting brackets for simplified construction and assembly. A picture tube encircling band may also be hooked to corners of the cabinet bezel, which form the tube support members, so that the bezel may maintain pressure on the protective panel and sealing gasket against the tube face. As an alternative, pressure sensitive tape may be used instead of the bezel to retain the protective panel and gasket on the tube face in sealed relation.

Figures 1, 2, 3:
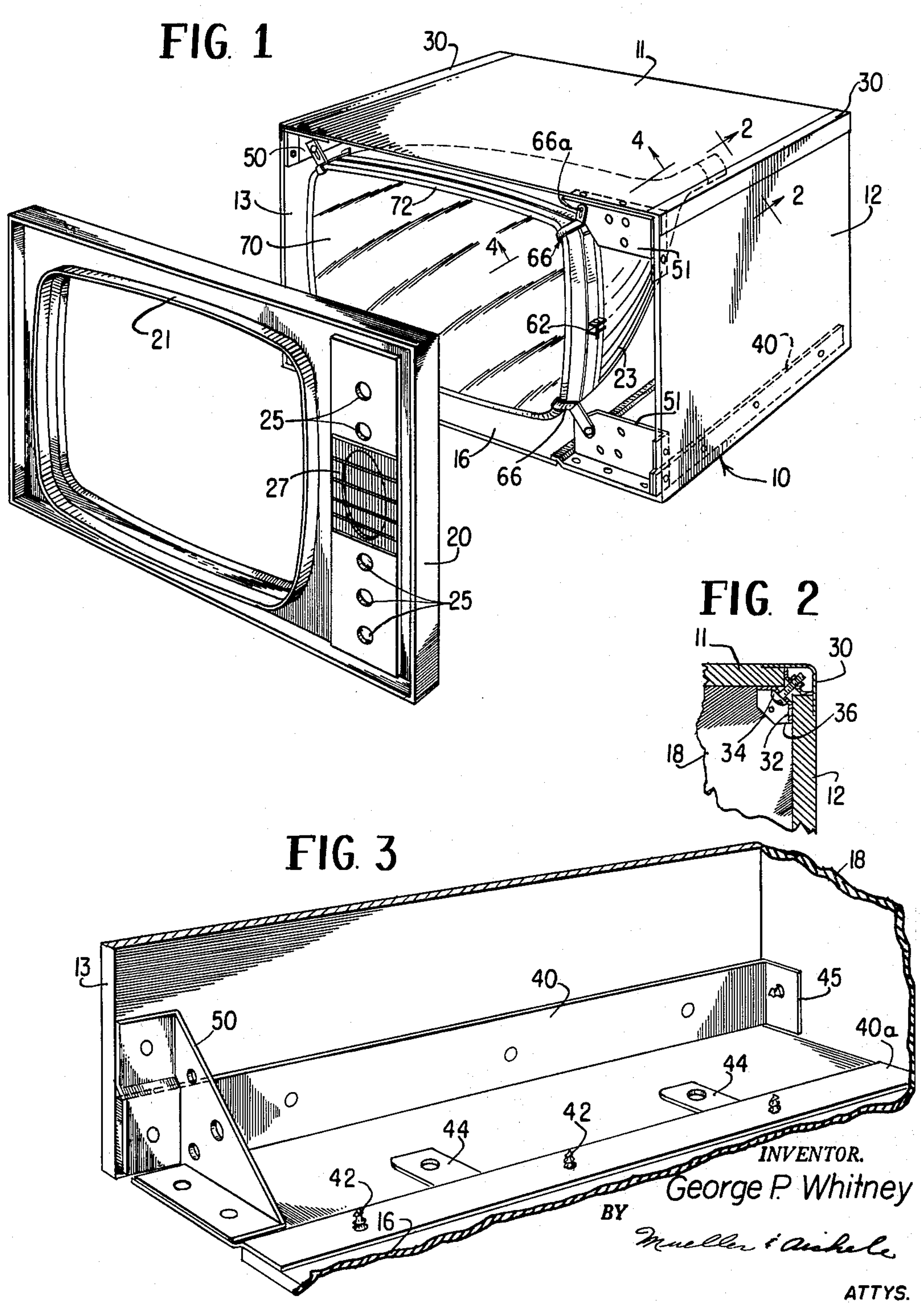
FIG. 1 is an exploded perspective view of a television receiver cabinet and picture tube assembly.
FIG. 2 is a sectional view of the cabinet along line 2—2 of FIG. 1.
FIG. 3 is a perspective view of the interior of the lower left hand portion of the cabinet of FIG. 1.

In FIG. 1 the television receiver 10 comprises a knock-down cabinet having a top panel 11 and side panels 12 and 13. The bottom is enclosed by a panel 16 and the back of the cabinet is covered by a back panel 18 (FIG. 2). A bezel 20 is positioned across the front of the receiver 10 and the bezel includes an opening 21 so that the face of the cathode ray picture tube 23 is visible. Bezel 20 also includes openings 25 through which the various controls (not shown) of the receiver may project, such as the tuning control, the volume control, the contrast control, etc. A grill 27 in bezel 20 affords openings to pass sound from a loudspeaker (not shown).

The two side panels 12 and 13 are joined to the top panel 11 in a manner best shown in FIG. 2. The adjacent edges of the top panel 11 and the side panel 12 are effectively clamped by means of an outer corner clamping member 30 and an inner clamping member 32. The clamping members 30, 32, overlie outwardly and inwardly facing surfaces of the panels 11, 12 to frictionally clamp and retain them. Members 30 and 32 are held tightly against the panels 11 and 12 by means of threaded fasteners, such as fastener 34, spaced along the length of the clamping members. A flange 36 at the rearward end of the inner clamping member 32 provides a means for fastening the back panel 18 to the assembly. A more detailed explanation and disclosure of a television receiver cabinet assembly is made in Patent No. 2,969,268 issued January 24, 1961, to the assignee of the present invention.

FIG. 3 shows the manner of securing the bottom panel 16 to the side panels 12 and 13. An angle member 40 is riveted along the lower inner surface of the side panel 13 and includes a further portion which projects perpendicular to the panel 13 with an upward offset **40*a*. The bottom panel 16 is seated in the offset 40*a* and retained there by means of threaded fasteners 42. Bosses 44 in the horizontal portion of angle member 40 are used for the purpose of mounting a television receiver chassis within the cabinet assembly. Suitable rubber feet, not shown, can be secured to the angle member 40 to support the receiver assembly. Back panel 18 is secured to the angle member 40 by means of the flange 45. It should be apparent that the back panel 18 can be readily removed for access to the inside of the cabinet assembly, or that the bottom panel 16 can be removed by removing the threaded fasteners 42** in order to permit access to the components on the underside of the receiver chassis.

Corner plates 50 and 51 are secured by rivets within each of the four corners at the front of the cabinet assembly. Corner plate 50 as shown in FIG. 3, is riveted to the two right angle portions of the angle member 40 as well as to the side panel 13. As shown in FIG. 1, the corner plates 51 are riveted to the cabinet and one of these is riveted to the angle member 40. However, the other corner plate 51 is not secured to the clamping members 30 or 32. The corner plates have webs extending between the portions thereof which are secured to the cabinet panels and the framing or angle members. Therefore, these corner plates 50 and 51 serve to strengthen the cabinet, and, as will be described subsequently, provide a mounting for the cathode ray tube 23 which rigidizes the cabinet assembly.

Figures 4, 5:
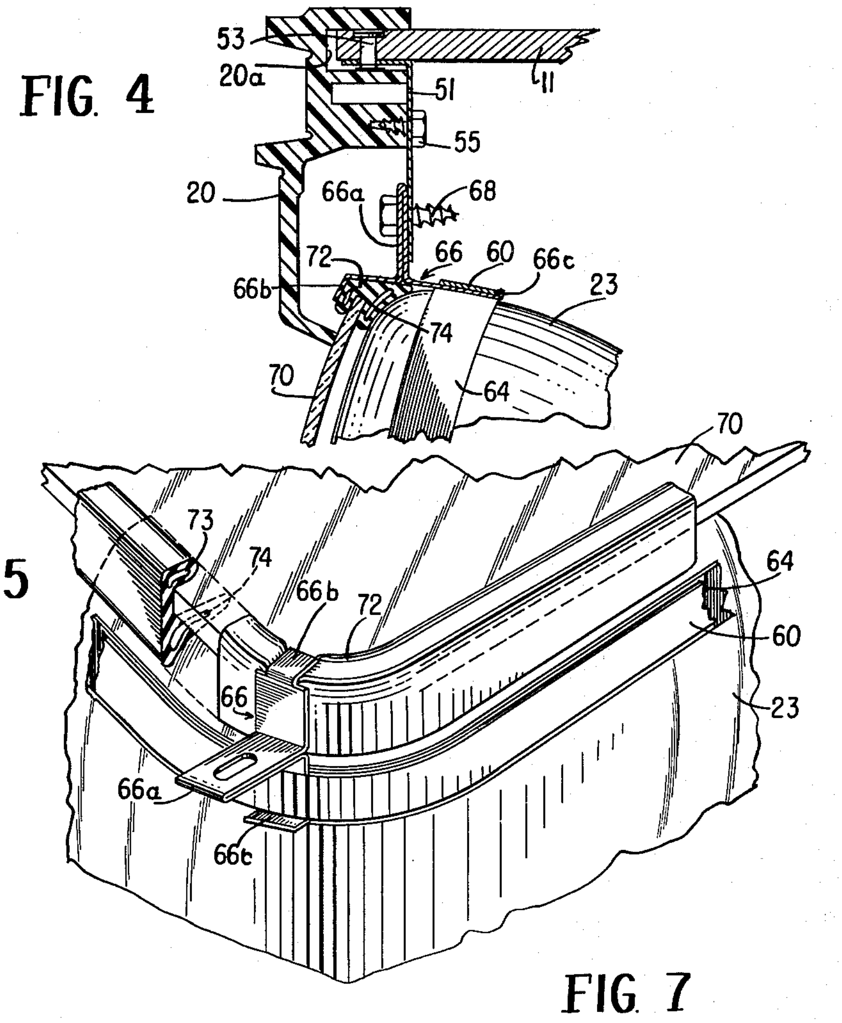
FIG. 4 is a sectional view along the line 4—4 of FIG. 1 with the bezel mounted in place.
FIG. 5 is a perspective view of a portion of the picture tube assembly as shown in FIG. 1.

FIG. 4 is a sectional view with the bezel 20 secured in place and this view clearly shows the mounting of the cathode ray picture tube 23 within the cabinet. It may be noted that the bezel 20 includes an opening 20*a* which receives the forward edge of the top panel 11. A similar opening encloses the forward edges of panels 12 and 13. In this way, the rivets along the forward edges of panels 11, 12 and 13, which secure the corner plates 50 and 51 are covered from view. Rivet 53 is so shown in FIG. 4. Threaded fasteners, such as 55, secure the corner plates 50 and 51 to the bezel 20 and these are installed from inside of the cabinet assembly. With this assembly of the cabinet, only the relatively unobtrusive rivets along the angle member 40 at the bottom edges of the cabinet would be visible. As an alternative, it is possible to use adhesive in securing the panels 12 and 13 to the angle member 40. The described cabinet structure is of the knock-down variety so that the separate parts can be stored compactly and assembled readily at the point where the chassis and picture tube are installed.

The picture tube and safety panel assembly may be understood by consideration of FIGS. 4 and 5. A picture tube encircling band 60 surrounds the funnel portion of the picture tube 23 rearwardly of the front face of the tube. As visible in FIG. 4, the band 60 is disposed at a position where the slope of the funnel of the tube is extending rearwardly so that tightening of the band 60 by means of the threaded fastener 62 (FIG. 1) will prevent the band 60 from moving outwardly of the face of the picture tube. The band 60 is positioned on a cloth tape 64.

The picture tube support members or mounting brackets 66 underlie the encircling band 60 at each of the four corners of the front face of the tube 23. Brackets 66 include outwardly projecting flanges 66*a* and these are secured to the web portions of the corner plates 50 and 51 by means of a threaded fastener 68 (FIG. 4). In this way, a very secure mounting for the picture tube 23 is provided. Furthermore, with the encircling band 60 firmly in place on the picture tube 23, the tube actually serves to strengthen and rigidize the cabinet assembly as it is shown in FIG. 1. Accordingly, it is unnecessary to provide other framing members within the cabinet or to support the picture tube on the television receiver chassis as has been done in the past. A knock-down cabinet assembly as rigidized in the assembled form with the picture tube mounted as described, can be sturdy enough to receive the relatively heavy receiver chassis and support the same without further structural members within the cabinet.

A protective or safety panel 70 is positioned over the face of the tube 23. The transparent panel 70 is maintained in spaced relation from the tube by means of a sealing gasket 72 which completely envelopes the edge of the panel 70. As seen in FIGS. 4 and 5, openings 73 and 74 extend throughout the length of the gasket 72. The opening 74 provides additional cushioning between the inner surface of the panel 70 and the face of the tube 23. The brackets 66 each include a hook portion or lip 66*b* which extends downwardly over the forward facing portion of the gasket 72. The opening 73 in the gasket affords additional cushioning between the hook portion 66*b* and the face of the panel 70. It is by means of the hook portions that the gasket 72 and the safety panel 70 are retained firmly in place and urged toward the face of the picture tube 23.

In assembly of the safety panel 70 to the face of the picture tube 23, the panel and gasket are positioned over the tube and the brackets 66 and the encircling band 60 are positioned. Then by urging brackets 66 rearwardly and slightly compressing the panel 70 in the resilient gasket against the tube face, the band 60 is tightened. Tightening of band 60, as previously explained, tends to cause the band to move rearwardly of the tube 23 thereby urging the bracket 66 sufficiently to compress the gasket against the tube face (FIG. 5). The rear edge of bracket 66 is upturned to form a lip 66*c* which engages the band 60 to prevent the band from sliding off the bracket. This assembly results in both a protective cushion between the safety panel 70 and the tube face as well as an effective seal. Therefore, if the tube 23 should implode through some mishap, the edge of the panel 70 is protected to prevent particles from striking the edge and causing the glass to shatter. Furthermore, there can be some slight amount of resilience between the tube face and the panel to withstand pressures without undue straining of the panel 70. At the same time, the sealing gasket 72, formed e.g., of polyvinyl chloride, will also prevent the entry of dust upon the tube face and will furnish a moisture seal thereby greatly alleviating the problem of cleaning the picture tube face and insuring a clear and unobstructed picture.

Figure 6:
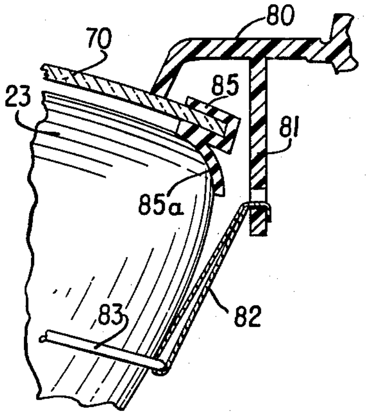
FIG. 6 is a sectional view similar to FIG. 4 and showing a modified assembly of the tube, panel and cabinet bezel.

FIG. 6 is a view similar to FIG. 4 of a modified form for mounting the picture tube assembly. The bezel 80 includes a support member or rearward projection 81 in each of the four bezel corners having an aperture to receive the strap member 82. An encircling band 83 is tightened around the rearwardly slanted portion of the tube 23 and this tends to draw the picture tube and safety panel 70 forward against a lip of the bezel 80. The strap member 82 is therefore in tension between the encircling band 83 and the portion 81 of the bezel 80. The gasket 85 has a U-shaped channel to receive the edge of the panel 70 and further includes a reversely extending portion 85*a* which forms a seal around the periphery of the face of the picture tube.

Figure 7:
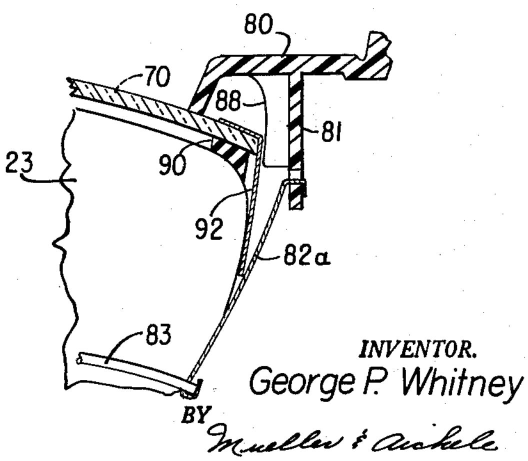
FIG. 7 is a sectional view showing a further modification of the apparatus of FIG. 6.

In FIG. 7 the bezel 80 includes a portion 81 having an aperture to receive the clip member 82*a* which engages the encircling band 83 to draw the picture tube and safety panel toward the bezel for support thereof. Bezel 80 is also shown to include ribs such as rib 88 which would be spaced around the interior of the bezel to engage the peripheral edge of the panel 70 and insure against any lateral movement of the panel. The gasket 90 has a modified form wherein one face engages the surface of the picture tube and the other face engages the inner peripheral edge of the panel 70. Gasket 90 may extend around the entire periphery of the panel 70. Alternatively the gasket 90 may be in the form of spacer pads located only at intervals around the outer region of the picture tube face.

In order to insure a proper seal between the tube 23 and the panel 70, the pressure sensitive tape 92 is positioned around the entire joint between the panel and the tube just as the gasket is so positioned in the form shown in FIG. 5. Such tape may be formed of industrial cloth and impregnated with a polyvinyl chloride plastic sealer to improve the sealing against moisture and dust penetration. It is also possible to use a tape composed of kraft paper which has high tear and tensile strength. Such paper can be impregnated with polyethylene plastic to give the necessary strength and moisture resistance.

To assemble the safety panel 70 to the cathode ray tube 23 by tape as shown in FIG. 7, it is preferable to place the panel 70 under slight pressure with the gasket 90 compressed against the face of tube 23 while the tape 92 is positioned. In this way, when the pressure is released the tape is under slight tension to give a very satisfactory assembly. It should be noted that a guide for lateral movement of the panel 70 may be provided by other than the ribs 88 of the bezel 80. For example, brackets like brackets 66 of FIG. 5 may be used at the four corners of the panel 70 and these brackets may be retained by a strap such as encircling band 60 to provide a means for supporting the tube just as tube 23 is supported in FIG. 4.

Accordingly, this invention provides apparatus for retaining a protective panel upon a cathode ray picture tube so as to seal out moisture and dust. This assembly is relatively simple and inexpensive so that manufacturing costs are low but reuse and reassembly of the protective panel apparatus are still possible upon replacement of the picture tube. As the picture tube assembly is mounted within a receiver cabinet it is possible to provide the mounting in a manner that further strengthens the cabinet structure to reduce the cost and weight of the receiver by eliminating structural members within the cabinet. Utilizing the teachings described above it is feasible to assemble television cabinets at the point of final receiver assembly and to do so with relatively few and easily manipulated parts.

I claim:

1. A television receiver assembly including in combination, a generally rectangular cabinet housing, four corner members spaced at diagonally opposing positions within said cabinet housing and adjacent the front thereof, a cathode ray tube having a face, a transparent protective panel for said tube, a resilient gasket positioned around the periphery of said panel, an encircling band clamped in fixed relation around said cathode ray tube, and four mounting brackets rigidly fastening said band to said corner members, said mounting brackets each including a lip clamping said gasket and said panel upon the face of said tube at the corners of such face thereof for mounting said tube and sealing said panel upon said tube face.

2. A television receiver assembly including in combination, a television receiver cabinet having a bezel with a generally rectangular picture tube opening with mounting means at the corners thereof, a cathode ray picture tube with a generally rectangular face, a transparent protective panel for said face of said picture tube, cushioning means between said picture tube face and the peripheral edge of said panel, pressure sensitive tape securing said panel to said picture tube face with said cushioning means compressed therebetween, said tape extending about the entire peripheral edge of said panel to prevent entry of foreign matter upon said face of said picture tube, a band encircling said picture tube and adjacent the face thereof, and clips secured between said band and said mounting means for supporting said picture tube in the opening of said bezel.

3. A television receiver assembly including in combination, a generally rectangular knock-down television cabinet formed of separate rigid panels including a top panel, two side panels and a bottom panel, means for securing said panels in finished condition to form a cabinet housing at a location at which the television chassis may be installed in said cabinet housing, corner plates secured in the inner front corners of said cabinet housing, said cabinet housing with the panels thereof in assembled relation having insufficient structural rigidity for use to house a television receiver without further bracing thereof, a television picture tube having a screen at the front thereof, a flat encircling band compressively clamped in fixed relation upon the periphery of said tube immediately rearwardly of said screen, mounting members rigidly secured to said encircling band, threaded fasteners securing said mounting members to said corner plates to form the sole mounting means for said cathode ray tube and to rigidize said cabinet housing by means of the assembly of said tube and said encircling band and said mounting means, and a decorative bezel secured to said cabinet housing for partially enclosing the front thereof and providing direct view of said screen of said cathode ray tube.

References Cited by the Examiner

UNITED STATES PATENTS

| | | | |
|---|---|---|---|
| 2,929,667 | 3/1960 | Jackson ---------- | 178—7.8 X |
| 2,969,268 | 1/1961 | Mason et al. ------ | 178—7.9 X |
| 3,084,217 | 4/1963 | Fiore et al. --------- | 178—7.82 |

ROBERT H. ROSE, *Primary Examiner.*

DAVID G. REDINBAUGH, *Examiner.*